United States Patent [19]
Baab et al.

[11] 4,081,811
[45] Mar. 28, 1978

[54] DIAPHRAGM PRESELECTOR FOR CAMERA OBJECTIVE

[75] Inventors: Albert Baab; Paul Himmelsbach, both of Bad Kreuznach, Germany

[73] Assignee: Jos. Schneider & Co., Optische Werke Kreuznach, Bad Kreuznach, Germany

[21] Appl. No.: 769,204

[22] Filed: Feb. 16, 1977

Related U.S. Application Data

[63] Continuation-in-part of Ser. No. 752,833, Dec. 21, 1976.

[30] Foreign Application Priority Data

Dec. 22, 1975  Germany ............................ 2557855

[51] Int. Cl.² ............................................. G03B 9/02
[52] U.S. Cl. ..................................... 354/272; 354/274
[58] Field of Search ......................... 354/270, 272, 274

[56] References Cited
U.S. PATENT DOCUMENTS 3,715,965  2/1973  Alfredsson ........................... 354/274

*Primary Examiner*—John Gonzales
*Attorney, Agent, or Firm*—Karl F. Ross

[57] ABSTRACT

An iris diaphragm of a reflex camera, spring-biased into a wide-open position, is settable to a preselectable stop position via a linkage including a cam follower on an integral extension of a resilient swing ring oscillatable about an off-axial fulcrum. The cam follower coacts with a cam disk which is manually rotated against the force of a restoring spring during a windup operation and, upon subsequent release, displaces the cam follower and the swing ring which entrains the setting ring of the diaphragm through a yieldable coupling to the selected stop position and restores it to the wide-open position in the course of a revolution. During windup, a beveled flank on the high dwell of the cam disk axially displaces the extension of the swing ring which is thereby made ineffectual and prevented from reducing the diaphragm aperture.

9 Claims, 5 Drawing Figures

DIAPHRAGM PRESELECTOR FOR CAMERA OBJECTIVE

CROSS-REFERENCE TO RELATED APPLICATION

This is a continuation-in-part of our copending application Ser. No. 752,833 filed Dec. 21, 1976.

FIELD OF THE INVENTION

Our present invention relates to an iris diaphragm for a camera equipped with a reflex-type viewfinder

BACKGROUND OF THE INVENTION

In such cameras, especially in those provided with interchangeable objectives in which the reflex mirror must be disposed behind an iris diaphragm, it is known to provide a preselector which is adjustable to a desired stop position, the diaphragm being normally biased into its wide-open position from which is it briefly displaced into the preselected position just before the tripping of a shutter by a release button or the like. This enables the operator to use full illumination when sighting and focusing upon an object to be photographed.

Such cameras are generally equipped with a windup handle which is manually operated to advance the film, cock the shutter and possibly carry out additional functions such as reactivating the viewfinder after its disablement upon the previous exposure. With the subsequent actuation of the shutter release, by which a control member coupled with the handle is returned to its original position by a restoring spring, the motion of this control member can be utilized to displace the iris diaphragm into its selected stop position and back to its wide-open position in timed relationship with the opening and closure of the shutter. Such an arrangement, which does not use the windup stroke itself for diaphragm control, has been disclosed in German Pat. No. 2,062,230. That system comprises a cam disk executing a full forward rotation during the windup stroke and a full reverse rotation during the return stroke, a coacting cam follower being connected with the setting ring of the diaphragm through a linkage including a yieldable coupling. The linkage further comprises a relatively complicated system of levers and springs designated to facilitate the escapement of the cam follower during the next windup stroke without entrainment of the setting ring.

OBJECT OF THE INVENTION

The object of our present invention is to provide an improved preselecting mechanism of this character which is of simplified construction and has a reduced number of relatively movable parts.

SUMMARY OF THE INVENTION

In accordance with our present improvement, the linkage between the cam follower and the setting ring of the iris diaphragm comprises a swingable member having a fulcrum offset from the diaphragm axis (which is also the axis of the associated objective), the cam follower being rigid with a resilient extremity of this member which lies substantially diametrically opposite the fulcrum with reference to that axis. The cam disk and the cam follower are provided with coating surfaces serving for the axial deflection of the cam follower, and thereby of the extremity of the swingable member on which it is supported, at the beginning of each windup stroke whereby the cam follower is disaligned for the remainder of that stroke from a radially effective ramp surface of the disk normally engaged by it; thus, the aforementioned camming surfaces form part of a unidirectionally effective escapement mechanism which deactivates the setting control during windup. An abutment coacting with the axially deflected extremity facilitates realignment of the cam follower with the ramp surface at the end of each windup stroke; this abutment preferably forms a contact surface on the cam disk engageable by the cam follower itself.

In a preferred embodiment of our invention, the swingable member comprises an oscillating ring substantially centered on the diaphragm axis at least in the wide-open position in which the cam follower engages a low dwell on the coating ramp surface, the aforementioned extremity being an extension of this ring.

BRIEF DESCRIPTION OF THE DRAWING

The above and other features of our invention will now be described in detail with reference to the accompanying drawing in which.

SPECIFIC DESCRIPTION

Figure 1:
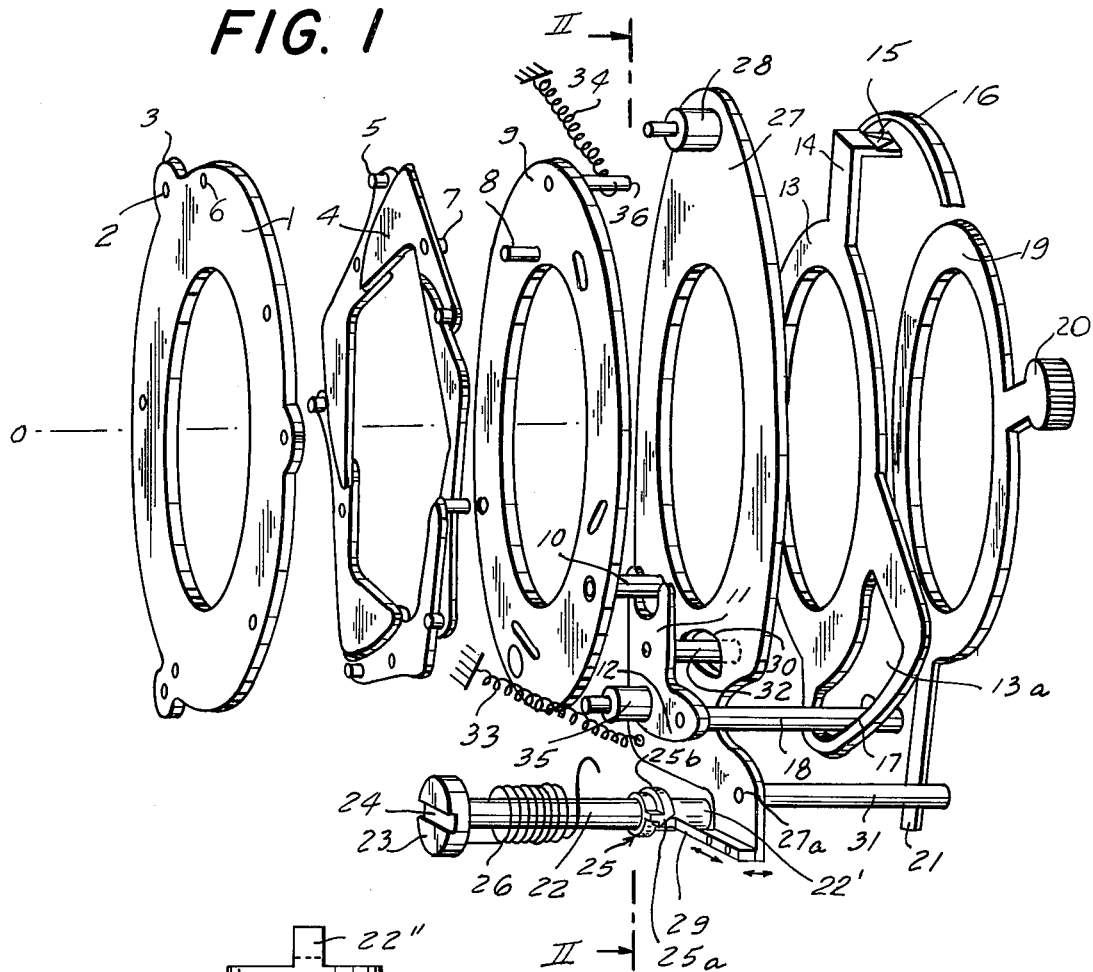
FIG. 1 is an exploded perspective view of an iris diaphragm and an associated preselecting mechanism according to our invention.
Figure 2:
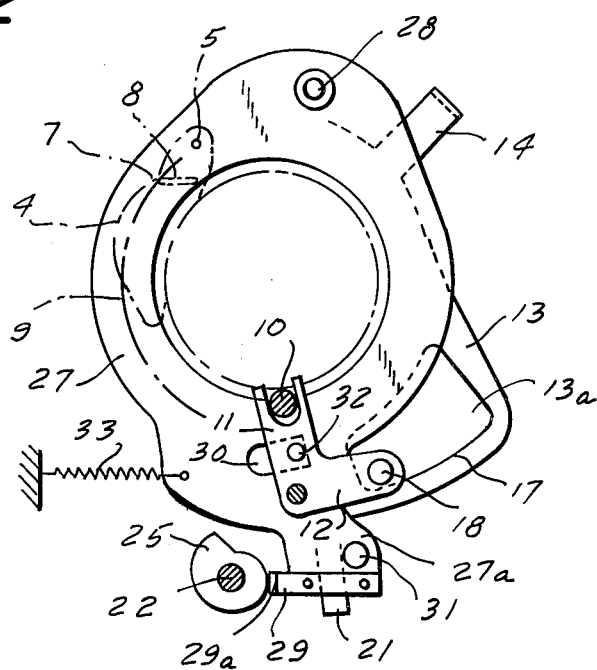
FIG. 2 is an axial view of part of the assembly, taken on the line II—II of FIG. 1.

In order to facilitate a comparison between the system of the aforementioned German Pat. No. 2,062,230 and our present improvement, the same reference numerals have been used wherever practical. The illustrated assembly comprises a mounting ring 1 of an iris diaphragm having lugs 3 with holes 2 for pins 5 of a set of iris leaves 4 having other pins 7 receivable in inclined guide slots 8 of a setting ring 9 rotatable with reference to ring 1 about a common axis 0. A preselecting ring 13, centered on the same axis, carries a lug 14 with a pointer 15 co-operating with a stationary diaphragm scale 16. Ring 13 has a cutout 13a with an edge 17, not centered on the diaphragm axis, engageable by a pin 18 on an arm 12 of a bell-crank lever having a fixed fulcrum 35. A second arm 11 of this lever has a bifurcate end engaging a stud 10 which is rigid with setting ring 9. Another stud 36 on ring 9 is connected to a coil spring 34 which is anchored to the objective housing and tends to rotate the ring 9 counterclockwise (as viewed in FIGS. 2 and 3) into a wide-open position in which the iris leaves 4 are fully withdrawn as shown in FIGS. 1 and 2. With pointer 15 confronting a selected mark on scale 16, the curvature of edge 17 determines a point beyond which the ring 9 will not be able to rotate clockwise against the force of spring 34.

Figure 3:
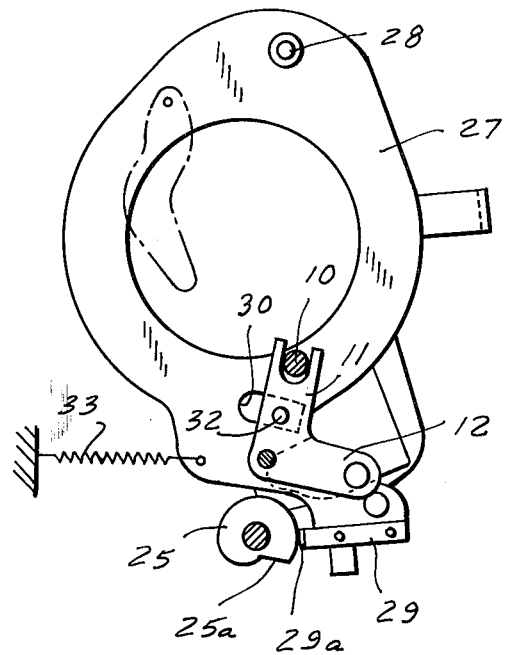
FIG. 3 is a view similar to FIG. 2, showing an alternate position.

In accordance with our present invention, an oscillating ring 27 of resilient sheet material (e.g. punched from a metallic or plastic foil) is swingable about a fixed fulcrum 28 on one side of the objective axis 0, i.e. at the top as shown in FIGS. 1–3, and is provided at its opposite side (thus at the bottom) with an integral extension 27a rigidly connected with a cam follower 29. The latter coacts with a cam disk 25 on a shaft 22 having a coupling head 23 provided with a slot 24 through which it is linked with a nonillustrated control element, such as a shaft of a pinion driven through approximately 360° upon the displacement of a windup handle coupled with a gear or rack in mesh with that pinion. A restoring spring 26 is tensioned during a clockwise windup stroke after which the shaft 22 and the disk 25 are latched in the position of FIG. 2, with the cam follower 29 urged by a spring 33 against a low dwell of the disk. A pin 32 on lever arm 12 passes through a slot 30 of swing ring 27 and is normally held against the right-hand end of that slot (as viewed in FIGS. 2 and 3) by the spring 34 acting through ring 9 and stud 10; pin 32 and slot 30 thus constitute a yieldable lost-motion coupling between setting ring 9 and cam follower 29. Shaft 22 is journaled in a housing wall 35, omitted for the sake of clarity in FIG. 1 but shown in FIGS. 4 and 5. An extension 22' of this shaft beyond cam disk 25 ends in a pair of lugs 22" by which it may be coupled to an unidirectional film-transport mechanism.

Upon the tripping of the shutter release, the nonillustrated control element coupled with shaft 22 is unlatched whereupon spring 26 rotates the shaft and cam disk 25 counterclockwise as viewed in FIGS. 2 and 3. Cam follower 29, riding on a ramp surface 25b of disk 25, is progressively displaced toward the right and eventually comes to rest on the high dwell of the cam after about half a revolution. At or before this point, depending upon the setting of preselector ring 13, pin 18 contacts the edge 17 of that ring so that setting ring 9 is no longer entrained and iris leaves 4 occupy the selected position as diagrammatically illustrated for one of these leaves in FIG. 3. Next, the nonillustrated camera shutter is briefly opened with stoppage of the rotation of shaft 22, if necessary, to expose the film. Thereafter, as cam disk 25 continues its rotation beyond the position of FIG. 3 into substantially its starting position shown in FIG. 1, as determined by the engagement of a web 25c with a fixed stop 37 on housing wall 36, cam follower 29 drops back onto the low dwell of disk 25 and restores the setting ring to normal, thereby returning the diaphragm to its wide-open position shown in FIG. 2. Swing ring 27 also reverts to its normal position centered on axis 0.

Figure 5:
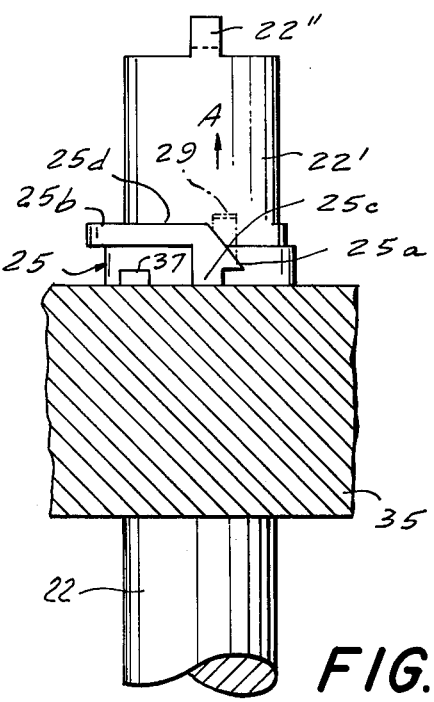
FIG. 5 is a cross-sectional view taken on the line V—V of FIG. 4.
Figure 4:
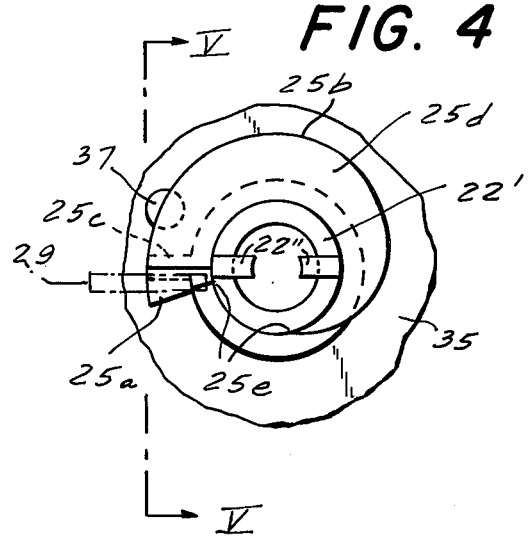
FIG. 4 is a detail view, drawn to a larger scale, of a camming mechanism included in the assembly of FIGS. 1–3.

During the next windup stroke, which is clockwise in FIGS. 2 and 3 but counterclockwise in FIG. 4, a beveled flank 25a extending from the high dwell of cam disk 25 to its low dwell coacts with an oppositely beveled facet 29a of cam follower 29 whereby extension 27a of swing ring 27 is resiliently deflected in an axial direction indicated by an arrow A in FIG. 5. The resiliency of ring 9 and the force of spring 33 now combine to hold the cam follower 29 against a face 25d of cam disk 25 as well as against a contact surface constituted by the periphery of shaft extension 22' which thus acts as an abutment limiting the displacement of ring extension 27a of spring 33. At the end of the windup stroke, with stop 37 contacted by the opposite side of web 25c, cam follower 29 confronts a zone 25e of disk 25 in which the ramp surface 25b is flush with the contact surface of shaft extension 22' so that the cam follower is able to snap back into alignment with the coacting ramp surface to re-establish the initial starting position in which the associated control element is relatched. Thus, the assembly shown in FIGS. 4 and 5 constitutes a unidirectionally effective escapement mechanism as discussed above.

As in the prior German patent already referred to, an ancillary ring 19 also centered on axis 0 is provided with a handle 20 by which it may be rotated to reduce the diaphragm aperture independently of the shutter release within the limits set by preselector 13, 14. Ring 19 has an extension 21 engaging a pin 31 on ring extension 27a whereby counterclockwise rotation of ring 19 separates the cam follower 29 from cam disk 25 within the limits established by curve 17 of ring 13.

The compact preselection mechanism according to our invention links the setting ring 9 and the cam follower 29 through the intermediary of only two relatively movable members forming a lost-motion coupling therebetween, i.e. the oscillating ring 27 and the bell-crank lever 11, 12 establishing a positive connection between ring 9 and pin 32; there is no need for a biasing spring acting upon that lever. This minimizes the risk of malfunction due to spring fatigue or similar mechanical failures.

We claim:

1. In a reflex camera having an iris diaphragm centered on an optical axis and provided with a setting ring rotatable about said axis, biasing means engaging said settable ring for urging same into a wide-open diaphragm position, preselector means adjustable to a desired stop position, a spring-loaded cam disk manually rotatable in one direction against its spring force during a windup stroke and rotatable by its spring force in the opposite direction during a picture-taking operation, cam-follower means coacting with a radially effective ramp surface of said cam disk, and a linkage including a yieldable lost-motion coupling between said cam-follower means and said setting ring engageable with said preselector means for entraining said setting ring into the desired stop position, the improvement wherein said linkage comprises a swingable resilient member having a fulcrum offset from said axis, said cam-follower means being rigid with an extremity of said member substantially diametrically opposite said fulcrum with reference to said axis, said cam disk and said cam-follower means being provided with coacting surfaces for axially deflecting said extremity at the beginning of each windup stroke with consequent disalignment of said cam-follower means and said ramp surface for the remainder of said windup stroke.

2. The improvement defined in claim 1 wherein said member is an oscillatable ring substantially centered on said axis in said wide-open position.

3. The improvement defined in claim 2 wherein said yieldable coupling includes a pin positively connected with said setting ring and urged by said biasing means against an edge of a slot in said oscillatable ring traversed by said pin.

4. The improvement defined in claim 1 wherein said ramp surface has a low dwell engaged by said cam-follower means in said wide-open position and a high dwell engaged by said cam-follower means at an intermediate point of said windup stroke, said high dwell being separated from said low dwell by a beveled flank forming one of said coacting surfaces.

5. The improvement defined in claim 4, further comprising abutment means positioned for coaction with the axially deflected extremity of said member to enable a realignment of said cam-follower means with said ramp surface at the end of said windup stroke.

6. The improvement defined in claim 5 wherein said abutment means is rigid with said cam disk and forms a contact surface engageable by said cam-follower means.

7. The improvement defined in claim 6, further comprising stationary stop means for arresting said cam disk at the end of said windup stroke in starting position in which said cam-follower means confronts a portion of said contact surface substantially flush with said ramp surface whereby said realignment is facilitated.

8. The improvement defined in claim 7 wherein said cam disk is provided with a shaft, said abutment means being part of said shaft.

9. The improvement defined in claim 1, further comprising ancillary diaphragm-adjusting means linked with said extremity.

* * * * *